(12) United States Patent
Chu et al.

(10) Patent No.: US 10,764,855 B1
(45) Date of Patent: Sep. 1, 2020

(54) SYNCHRONIZING CLOCKS IN A WIRELESS NETWORK

(71) Applicant: Marvell International Ltd., Hamilton (BM)

(72) Inventors: Liwen Chu, San Ramon, CA (US); Hongyuan Zhang, Fremont, CA (US); Hui-Ling Lou, Sunnyvale, CA (US)

(73) Assignee: Marvell Asia Pte, Ltd., Singapore (SG)

( * ) Notice: Subject to any disclaimer, the term of this patent is extended or adjusted under 35 U.S.C. 154(b) by 24 days.

(21) Appl. No.: 16/262,616

(22) Filed: Jan. 30, 2019

Related U.S. Application Data

(60) Provisional application No. 62/635,407, filed on Feb. 26, 2018.

(51) Int. Cl.
 G06F 11/00 (2006.01)
 H04W 56/00 (2009.01)
 H04W 84/12 (2009.01)

(52) U.S. Cl.
 CPC ..... *H04W 56/0045* (2013.01); *H04W 56/001* (2013.01); *H04W 56/0065* (2013.01); *H04W 84/12* (2013.01)

(58) Field of Classification Search
 None
 See application file for complete search history.

(56) References Cited

U.S. PATENT DOCUMENTS 8,121,830 B2 * 2/2012 Srinivasan ............. G11B 20/10
 341/155
8,681,822 B2 * 3/2014 Bradley ............ H04L 29/06027
 370/503

(Continued)

FOREIGN PATENT DOCUMENTS

CN 107800526 A 3/2018
WO WO-2018/032774 A1 2/2018

OTHER PUBLICATIONS

IEEE Std 802.11-REVmc™/D8.0, Aug. 2016, "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).

(Continued)

*Primary Examiner* — Sithu Ko

(57) ABSTRACT

A first communication device includes a first timer and a second communication device includes a second timer. The first communication device receives, from the second communication device, a packet that includes a timestamp that corresponds to a least significant portion of the second timer. The first communication device determines whether a most significant bit of a least significant portion of the first timer is different than a most significant bit of the timestamp. At least when the most significant bit of the least significant portion of the first timer is different than the most significant bit of the timestamp: the first communication device determines a mathematical difference between i) the least significant portion of the first timer and ii) the timestamp, and selectively adjusts a most significant portion of the first timer based on the mathematical difference. The first communication device uses the timestamp to set the least significant portion of the first timer.

10 Claims, 6 Drawing Sheets

(56) References Cited

U.S. PATENT DOCUMENTS

| | | | |
|---|---|---|---|
| 9,713,087 B2* | 7/2017 | Asterjadhi | H04W 52/0212 |
| 9,763,074 B2* | 9/2017 | Park | H04L 27/261 |
| 9,854,547 B2* | 12/2017 | Chu | H04W 56/0015 |
| 10,148,796 B2* | 12/2018 | Wang | H04L 1/0061 |
| 10,212,065 B2* | 2/2019 | Kim | H04L 43/106 |
| 10,255,161 B2* | 4/2019 | Murrin | G06F 11/3636 |
| 10,555,257 B2* | 2/2020 | Yang | H04W 52/0229 |
| 2005/0026563 A1 | 2/2005 | Leeper et al. | |
| 2014/0112225 A1 | 4/2014 | Jafarian et al. | |
| 2014/0226683 A1* | 8/2014 | Castiel | H04L 12/64 370/474 |
| 2014/0293825 A1* | 10/2014 | Kalkunte | H04L 43/106 370/253 |
| 2015/0063375 A1* | 3/2015 | Tzeng | H04J 3/0667 370/512 |
| 2015/0208349 A1 | 7/2015 | Ramamurthy et al. | |
| 2016/0219510 A1* | 7/2016 | Asterjadhi | H04W 72/005 |
| 2016/0353399 A1* | 12/2016 | Zhao | H04L 69/28 |
| 2016/0366644 A1 | 12/2016 | Ghosh et al. | |
| 2016/0374020 A1 | 12/2016 | Azizi et al. | |
| 2017/0094600 A1 | 3/2017 | Min et al. | |
| 2017/0111858 A1 | 4/2017 | Azizi et al. | |
| 2018/0019902 A1 | 1/2018 | Suh et al. | |
| 2018/0020405 A1 | 1/2018 | Huang et al. | |
| 2018/0027561 A1 | 1/2018 | Segev et al. | |
| 2018/0049130 A1* | 2/2018 | Huang | H04W 56/001 |
| 2018/0184379 A1 | 6/2018 | Liu et al. | |
| 2018/0206192 A1 | 7/2018 | Vermani et al. | |
| 2019/0253167 A1* | 8/2019 | Wihamre | H04L 9/3297 |

OTHER PUBLICATIONS

Zhu et al., "IEEE P802.11, Wireless LANs, Proposed 802.11az Functional Requirements," Institute of Electrical and Electronics Engineers, doc. IEEE 802.11-16/0424r4, 6 pages (Mar. 13, 2017).

Park et al., "Proposal for Wake-Up Receiver (WUR) Study Group," IEEE Draft 802.11-16/0722r1, 14 pages (May 18, 2016).

* cited by examiner

SYNCHRONIZING CLOCKS IN A WIRELESS NETWORK

CROSS REFERENCES TO RELATED APPLICATIONS

This application claims the benefit of U.S. Provisional Patent Application No. 62/635,407, entitled "Timing Synchronization Function (TSF) Time in Low Power Sync," filed on Feb. 26, 2018, the disclosure of which is hereby expressly incorporated herein by reference in its entirety.

FIELD OF TECHNOLOGY

The present disclosure relates generally to wireless communication systems, and more particularly to synchronization of clocks among different communication devices in a wireless network.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

Some WLANs include low cost wireless devices, such as wireless sensors, that do not require high data rates. To reduce operating costs, it may be useful for such wireless devices to be battery operated or otherwise power constrained. Power saving techniques for reducing power consumption are used with such power-constrained wireless devices. For example, a WLAN network interface of a power-constrained wireless device is put into to a low power state (e.g., a sleep state) for periods of time in order to decrease power consumption of the wireless device. When the wireless device is ready to transmit data to an access point, the WLAN network interface is transitioned to an active state so that the data can be transmitted. After the WLAN network interface transmits the data, the WLAN network interface transitions back to the low power state.

A WLAN network interface of a power-constrained wireless device may "wake up" periodically to listen for transmissions from the access point to determine whether the access point has data to transmit to the wireless device. However, such periodic "wake ups" by the WLAN network interface consume power even when the access point has no data to transmit to the wireless device. Therefore, to further reduce power consumption, some wireless devices employ a low power wake up radio (LP-WUR) that consumes much less power as compared to the WLAN network interface. For example, the LP-WUR does not include any transmitter circuitry and may be capable of only receiving very low data rate transmissions. When the access point is ready to transmit data to the wireless device, the access point transmits a wakeup packet addressed to the wireless device. In response to receiving the wakeup packet and determining that the wakeup packet is addressed to the wireless device, the LP-WUR wakes up the WLAN network interface so that the WLAN network interface is ready to receive data from the access point.

SUMMARY

In an embodiment, a method of synchronizing a first timer at a first communication device with a second timer at a second communication device is disclosed, where the first timer comprises a least significant portion and a most significant portion, and the second timer comprises a least significant portion and a most significant portion. The method includes: receiving, at the first communication device, a packet that includes a timestamp, wherein the packet is from the second communication device, wherein the timestamp corresponds to the least significant portion of the second timer of the second communication device, and wherein the packet does not include any bits of the most significant portion of the second timer; determining, at the first communication device, whether a most significant bit of the least significant portion of the first timer is different than a most significant bit of the timestamp; at least when the most significant bit of the least significant portion of the first timer is different than the most significant bit of the timestamp, determining, at the first communication device, a mathematical difference between i) the least significant portion of the first timer and ii) the timestamp; when the most significant bit of the least significant portion of the first timer is different than the most significant bit of the timestamp, selectively adjusting, at the first communication device, the most significant portion of the first timer based on the mathematical difference between i) the least significant portion of the first timer and ii) the timestamp; and using, at the first communication device, the timestamp to set the least significant portion of the first timer.

In another embodiment, an apparatus for use in a communication network having a first communication device and a second communication device is disclosed, where the first communication device includes a first timer and the second communication device includes a second timer; and where the first timer comprises a least significant portion and a most significant portion, and the second timer comprises a least significant portion and a most significant portion. The apparatus comprises: a network interface device associated with the first communication device. The network interface device includes i) one or more integrated circuits (ICs), and ii) a timer circuit implemented on the one or more ICs. The timer circuit corresponds to the first timer. The one or more ICs are configured to: receive a packet that includes a timestamp, wherein the packet is from the second communication device, wherein the timestamp corresponds to the least significant portion of the second timer of the second communication device, and wherein the packet does not include any bits of the most significant portion of the second timer; determine whether a most significant bit of the least significant portion of the first timer is different than a most significant bit of the timestamp; at least when the most significant bit of the least significant portion of the first timer is different than the most significant bit of the timestamp, determine a mathematical difference between i) the least significant portion of the first timer and ii) the timestamp; when the most significant bit of the least significant portion of the first timer is different than the most significant bit of the timestamp, selectively adjust the most significant portion of the first timer based on the mathematical difference between i) the least significant portion of the first timer and ii) the timestamp; and use the timestamp to set the least significant portion of the first timer.

In yet another embodiment, another method of synchronizing a first timer at a first communication device with a second timer at a second communication device is disclosed, where the first timer comprises a least significant portion and a most significant portion, and the second timer comprises a least significant portion and a most significant portion. The method includes: determining, at the second communication device, a maximum number of sync frames from the second communication device that the first communication device is permitted to miss, wherein each sync frame is configured to include a respective timestamp, wherein each timestamp corresponds to a respective value of the least significant portion of the second timer of the second communication device; determining, at the second communication device, a time interval for transmitting the sync frames based on the determined maximum number of sync frames that the first communication device is permitted to miss; and transmitting, by the second communication device, the sync frames at the determined time interval.

In still another embodiment, another apparatus for use in a communication network having a first communication device and a second communication device is disclosed, where the first communication device includes a first timer and the second communication device includes a second timer; and where the first timer comprises a least significant portion and a most significant portion, and the second timer comprises a least significant portion and a most significant portion. The apparatus comprises: a network interface device associated with the second communication device. The network interface device includes i) one or more ICs, and ii) a timer circuit implemented on the one or more ICs. The timer circuit corresponds to the second timer. The one or more ICs are configured to: determine a maximum number of sync frames from the second communication device that the first communication device is permitted to miss, wherein each sync frame is configured to include a respective timestamp, wherein each timestamp corresponds to a respective value of the least significant portion of the second timer of the second communication device; determine a time interval for transmitting the sync frames based on the determined maximum number of sync frames that the first communication device is permitted to miss; and transmit the sync frames at the determined time interval.

DETAILED DESCRIPTION

Clock synchronization techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, clock drift mitigation techniques are utilized in other types of wireless communication systems such as personal area networks (PANs), mobile communication networks such as cellular networks, metropolitan area networks (MANs), satellite communication networks, etc. Additionally, although clock synchronization techniques are described below in the context of WLAN devices with low power wake up radios (LP-WURs), similar techniques are utilized in communication devices without LP-WURs, in some embodiments.

Figure 1A:
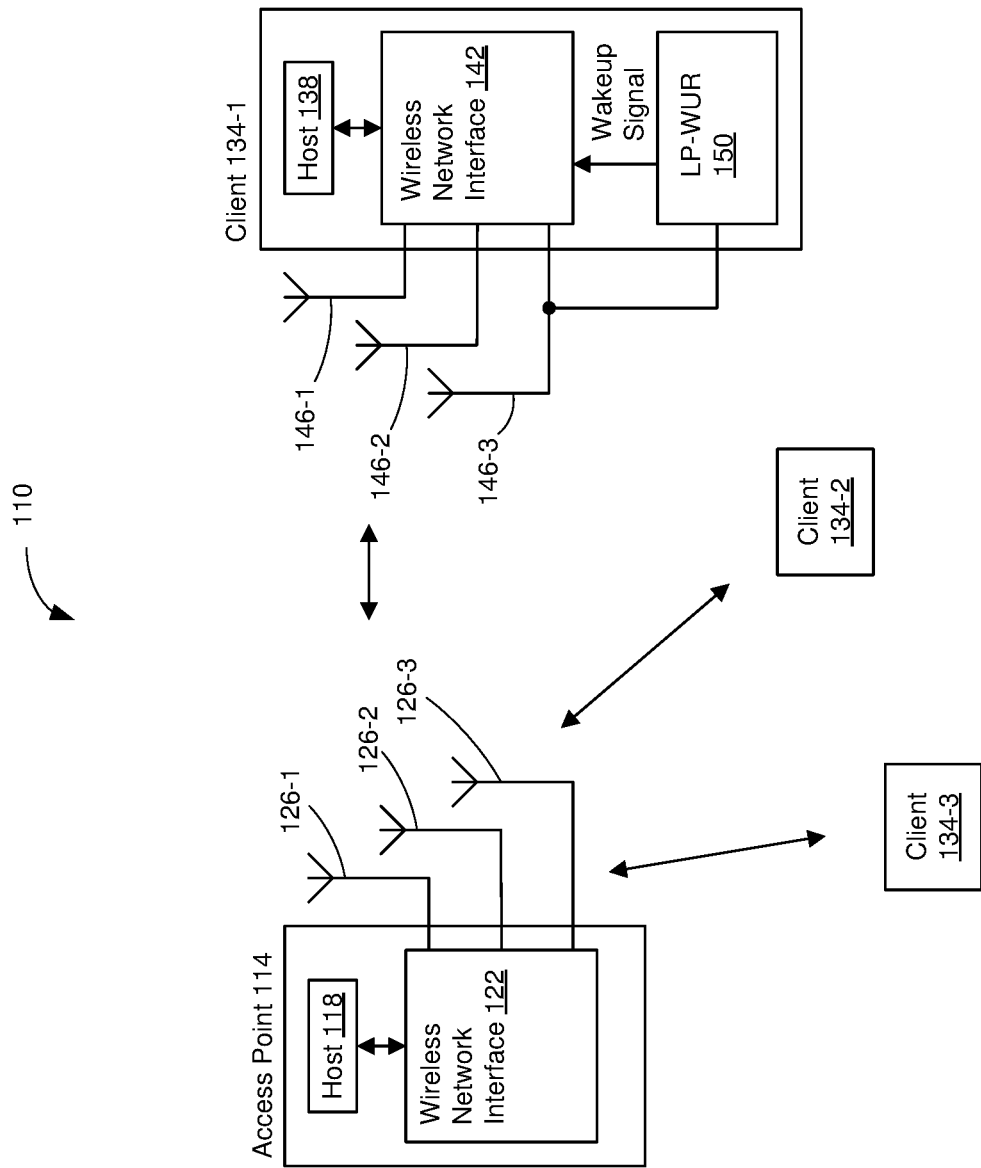
FIG. 1A is a block diagram of an example wireless local area network (WLAN) having a client station with a low power wake up radio (LP-WUR), according to an embodiment.

FIG. 1A is a block diagram of an example WLAN 110, according to an embodiment. The WLAN 110 includes an access point (AP) 114 that comprises a host processor 118 coupled to a wireless network interface device 122. The wireless network interface device 122 is coupled to a plurality of antennas 126. Although three antennas 126 are illustrated in FIG. 1A, the AP 114 includes other suitable numbers (e.g., 1, 2, 4, 5, etc.) of antennas 126 in other embodiments. As will be described in more detail below, the wireless network interface device 122 is configured to generate and transmit a wakeup packet that can be decoded by LP-WURs in the WLAN 110, wherein the wakeup packet is configured to prompt one or more of the LP-WURs to wake up a WLAN network interface coupled to the LP-WUR. Additionally, the wireless network interface device 122 is configured to generate packets that can be decoded by at least some of the LP-WURs (e.g., one or more of the LP-WURs) in the WLAN 110, and that include data information instead of, or in addition to, data configured to cause a LP-WUR to wake up a WLAN network interface (sometimes referred to herein as "non-wakeup data"). Packets that can be decoded by at least some of the LP-WURs are referred to herein as "WUR packets". WUR packets may be wakeup packets. WUR packets may also be packets that include non-wakeup data. Examples of non-wakeup data that may be included in WUR packets include WLAN beacon information, WUR capability information, WLAN capability information, WUR management data, WLAN management data, WUR control information, WLAN control information, etc. In an embodiment, the non-wakeup data can be used by the LP-WUR, and/or the WLAN network interface device that is coupled to the LP-WUR, for purposes other than waking up the WLAN network interface device.

The host processor 118 is configured to executed machine readable instructions stored in a memory device (not shown), according to an embodiment. The host processor 118 is implemented on an integrated circuit (IC), according to an embodiment. The wireless network interface device 122 is implemented on one or more ICs. The host processor 118 is implemented on one IC and the wireless network interface device 122 is implemented on one or more other, different ICs, according to an embodiment. The host processor 118 is implemented on a first IC and the wireless network interface device 122 is implemented on at least the same first IC and optionally on one or more second ICs, according to an embodiment.

The WLAN 110 also includes one or more client stations 134. Although three client stations 134 are illustrated in FIG. 1A, the WLAN 110 includes other suitable numbers (e.g., 1, 2, 4, 5, 6, etc.) of client stations 134 in various embodiments. The client station 134-1 includes a host processor 138 coupled to a wireless network interface device 142. The wireless network interface device 142 is coupled to one or more antennas 146. Although three antennas 146 are illustrated in FIG. 1A, the client station 134-1 includes other suitable numbers (e.g., 1, 2, 4, 5, etc.) of antennas 146 in other embodiments.

The wireless network interface device 142 is configured to go into a low power state in which the wireless network interface device 142 consumes significantly less power as compared to an active state of the wireless network interface device 142. The wireless network interface device 142 is capable of wirelessly receiving and transmitting via the one or more antennas 146 while in the active state. In an embodiment, the wireless network interface device 142 is incapable of wirelessly receiving and transmitting via the one or more antennas 146 while in the low power state.

The client station 134-1 also includes a LP-WUR 150 coupled to the wireless network interface device 142 and to at least one of the antennas 146. The LP-WUR 150 is configured to use very low power (e.g., less than 100 microwatts or another suitable amount of power). The LP-WUR 150 is configured to use significantly less power (e.g., less than 20%, less than 10%, less than 5%, less than 2%, less than 1%, etc.) than the wireless network interface device 142 while the wireless network interface device 142 is in the active state, according to an embodiment.

The LP-WUR 150 is configured to receive and decode WUR packets transmitted by the AP 114 and received via one or more of the antennas 146. The LP-WUR 150 is configured to determine whether a received wakeup packet includes an address (e.g., a media access control (MAC) address, an association identifier (AID), or another suitable network address) corresponding to the client station 134-1, according to an embodiment. The LP-WUR 150 is configured to generate a wakeup signal in response to determining that a received wakeup packet includes the address corresponding to the client station 134-1. An address corresponding to the client station 134-1 includes one or more of i) a unicast address corresponding to the client station 134-1, ii) a multicast address corresponding to a group of client stations that includes the client station 134-1, and/or iii) a broadcast address that corresponds to all client stations, in various embodiments.

When the wireless network interface device 142 is in the low power state and receives the wakeup signal from the LP-WUR 150, the wireless network interface device 142 is configured to transition to the active power state in response to the wakeup signal, according to an embodiment. For example, when the wireless network interface device 142 is in the low power state and receives the wakeup signal from the LP-WUR 150, the wireless network interface device 142 responsively transitions to the active power state to become ready to transmit and/or receive, according to an embodiment.

The host processor 138 is configured to executed machine readable instructions stored in a memory device (not shown), according to an embodiment. The host processor 138 is implemented on an IC, according to an embodiment. The wireless network interface device 142 is implemented on one or more ICs. The host processor 138 is implemented on one IC and the wireless network interface device 142 is implemented on one or more other, different ICs, according to an embodiment. The host processor 138 is implemented on a first IC and the wireless network interface device 142 is implemented on at least the same first IC and optionally on one or more second ICs, according to an embodiment.

The LP-WUR 150 is implemented on one IC and the wireless network interface device 142 is implemented on one or more other, different ICs, according to an embodiment. The LP-WUR 150 is implemented on a first IC and the wireless network interface device 142 is implemented on at least the same first IC and optionally on one or more second ICs, according to an embodiment.

In an embodiment, each of the client stations 134-2 and 134-3 has a structure that is the same as or similar to the client station 134-1. For example, one or both of the client stations 134-2 and 134-3 includes a respective LP-WUR, according to an embodiment. As another example, one or both of the client stations 134-2 and 134-3 does not include a LP-WUR, according to another embodiment. Each of the client stations 134-2 and 134-3 has the same or a different number of antennas (e.g., 1, 2, 3, 4, 5, etc.). For example, the client station 134-2 and/or the client station 134-3 each have only two antennas (not shown), according to an embodiment.

The network interface device 122 includes a timer circuit (or clock circuit) that is used, for example, for scheduling communications in the network 110. The timer circuit (not shown) is sometimes referred to herein as a time synchronization function (TSF) timer. The network interfaces devices of the client stations 134 also include respective TSF timers (not shown), and the network interfaces devices of the client stations 134 are configured to synchronize the respective TSF timers of the client stations 134 with the TSF timer of the AP 114. For example, the network interface device 122 is configured to transmit a value of the TSF timer (e.g., sometimes referred to herein as a "timestamp") of the AP 114 in periodically transmitted MAC data units (sometimes referred to herein as "frames") such as beacon frames, and the network interfaces devices of the client stations 134 are configured to synchronize the respective TSF timers of the client stations 134 with the TSF timer of the AP 114 using the TSF timer value in the periodically transmitted frames (e.g., beacon frames).

When the network interface device 142 of the client station 134-1 is in the low power state, however, the network interface device 142 may be unable to receive beacon frames from the AP 114. Due to small frequency differences between the TSF timer of the client station 134-1 and the TSF timer of the AP 114, over time when the network interface device 142 is not receiving beacon frames the TSF timer of the client station 134-1 will drift with respect to the TSF timer of the AP 114 (sometimes referred to herein as "clock drift") and become unsynchronized.

As is discussed in more detail below, the network interface device 122 of the AP 114 is configured to periodically transmit frames, in WUR packets (sometimes referred to herein as WUR sync packets), that include a partial value (e.g., a set of least significant bits) of the TSF timer of the AP 114. The LP-WUR 150 of the client station 134-1 is configured to receive the WUR sync packets and provide the partial values of the TSF timer of the AP 114 to the network interface device 142 of the client station 134-1. The network interface device 142 uses the partial values of the TSF timer of the AP 114 to adjust the TSF timer of the client station 134-1 to synchronize the TSF timer of the client station 134-1 with the TSF timer of the AP 114, e.g., when the network interface device 142 is in the low power state.

Figure 1B:
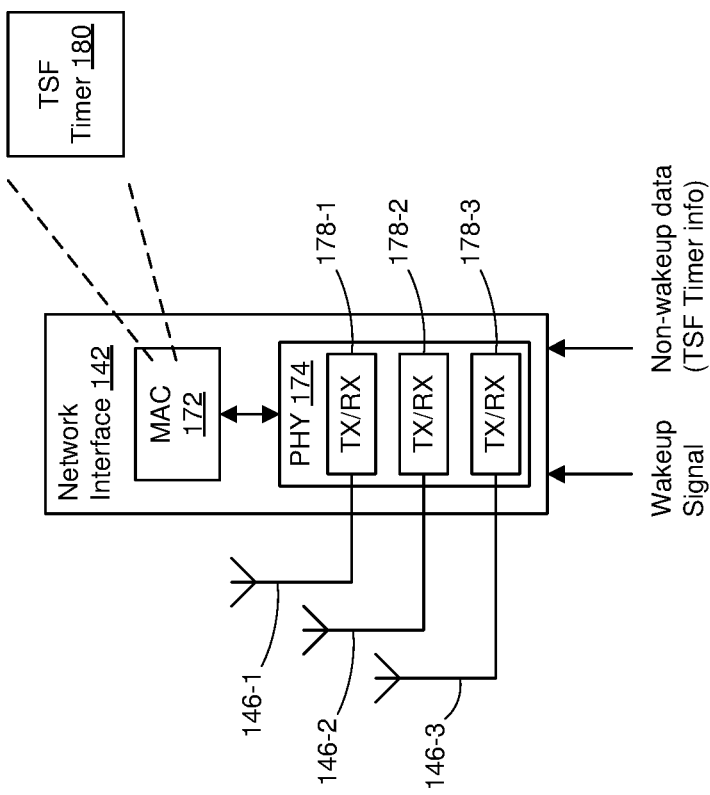
FIG. 1B is a block diagram of an example wireless network interface device of an access point included in the WLAN of FIG. 1A, according to an embodiment.

FIG. 1B is a block diagram of the network interface device 122 of the AP 114 of FIG. 1A, according to an embodiment. The network interface 122 includes a MAC layer processor 160 coupled to a physical layer (PHY) processor 164. The PHY processor 164 includes a plurality of transceivers 168 coupled to the plurality of antennas 126. Although three transceivers 168 and three antennas 126 are illustrated in FIG. 1B, the PHY processor 164 includes other suitable numbers (e.g., 1, 2, 4, 5, etc.) of transceivers 168 coupled to other suitable numbers of antennas 126 in other embodiments. In some embodiments, the AP 114 includes a higher number of antennas 126 than transceivers 168, and the PHY processor 164 is configured to use antenna switching techniques.

The network interface 122 is implemented using one or more ICs configured to operate as discussed below. For example, the MAC layer processor 160 may be implemented, at least partially, on a first IC, and the PHY processor 164 may be implemented, at least partially, on a second IC. As another example, at least a portion of the MAC layer processor 160 and at least a portion of the PHY processor 164 may be implemented on a single IC. For instance, the network interface 122 may be implemented using a system on a chip (SoC), where the SoC includes at least a portion of the MAC layer processor 160 and at least a portion of the PHY processor 164.

In various embodiments, the MAC layer processor 160 and/or the PHY processor 164 of the AP 114 are configured to generate data units, and process received data units, that conform to a WLAN communication protocol such as a communication protocol conforming to the IEEE 802.11 Standard or another suitable wireless communication protocol. For example, the MAC layer processor 160 may be configured to implement MAC layer functions, including MAC layer functions of the WLAN communication protocol, and the PHY processor 164 may be configured to implement PHY functions, including PHY functions of the WLAN communication protocol. For instance, the MAC layer processor 160 may be configured to generate MAC layer data units (sometimes referred to herein as "frames") such as MAC service data units (MSDUs), MAC protocol data units (MPDUs), etc., and provide the MAC layer data units to the PHY processor 164. The PHY processor 164 may be configured to receive MAC layer data units from the MAC layer processor 160 and encapsulate the MAC layer data units to generate PHY data units (sometimes referred to herein as "packets") such as PHY protocol data units (PPDUs) for transmission via the antennas 126. Similarly, the PHY processor 164 may be configured to receive PHY data units that were received via the antennas 126, and extract MAC layer data units encapsulated within the PHY data units. The PHY processor 164 may provide the extracted MAC layer data units to the MAC layer processor 160, which then processes the MAC layer data units.

In connection with generating one or more radio frequency (RF) signals for transmission, the PHY processor 130 is configured to process (which may include modulating, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more signals RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulating, filtering, etc.) the one or more digital baseband signals to generate a PPDU.

The PHY processor 130 includes amplifiers (e.g., a low noise amplifier (LNA), a power amplifier, etc.), a radio frequency (RF) downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 164 is configured to generate one or more RF signals that are provided to the one or more antennas 126. The PHY processor 164 is also configured to receive one or more RF signals from the one or more antennas 126.

The MAC processor 160 is configured to control the PHY processor 164 to generate one or more RF signals by, for example, providing one or more MAC layer data units (e.g., MPDUs) to the PHY processor 164, and optionally providing one or more control signals to the PHY processor 164, according to some embodiments. In an embodiment, the MAC processor 160 includes a processor configured to execute machine readable instructions stored in a memory device (not shown) such as a RAM, a read ROM, a flash memory, etc. In an embodiment, the MAC processor 160 includes a hardware state machine.

The MAC processor 160 includes a timer (or clock) circuit 170 (sometimes referred to herein as a "TSF timer"). The TSF timer 170 is used to maintain a network system clock for the network 110. The TSF timer 170 is used to schedule, for example, communications or other actions in the network 110. In an embodiment, the TSF timer 170 maintains a clock that consists of n bits, wherein n is a suitable positive integer. In an embodiment, n is 64. In other embodiments, n is another suitable integer such as 32, 50, 128, etc.

The MAC processor 160 is configured to generate frames that include respective values of (e.g., all n bits of) the TSF timer 170 (sometimes referred to herein as "full timestamps"), and that are configured to be received and decoded by network interface devices such as the network interface device 142 (sometimes referred to herein as "WiFi frames"). For example, the MAC processor 160 is configured to generate WiFi frames that include respective full timestamps corresponding to the TSF timer 170, and that are configured to be transmitted periodically by the network interface device 122, such as beacon frames. As another example, the MAC processor 160 is configured to generate WiFi frames that include respective full timestamps corresponding to the TSF timer 170, and that are configured to be transmitted by the network interface device 122 in response to requests from client stations (such as probe response frames transmitted in response to probe request frames from client stations 134). The PHY processor 164 is configured to encapsulate such WiFi frames in packets that are configured to be received and decoded by network interface devices such as the network interface device 142 (sometimes referred to herein as "WiFi packets"), and transmit the WiFi packets via the one or more antennas 126.

Additionally, the MAC processor 160 is configured to generate frames (sometimes referred to herein as "sync frames") that include respective partial values of (e.g., less than all n bits of) the TSF timer 170 (sometimes referred to herein as "partial timestamps"), and that are configured to be received and decoded by LP-WURs such as the LP-WUR 150. For example, the MAC processor 160 is configured to generate sync frames that include a set of m least significant bits of the TSF timer 170, where m is a suitable positive integer less than n. In an embodiment, m is 12. In other embodiments, m is a suitable integer other than 12, such as 8, 16, 20, etc. By including only m bits of the TSF timer 170 in the sync frame, the length and transmission time of the sync frame is reduced as compared to a frame that includes all n bits of the TSF timer 170. The PHY processor 164 is configured to encapsulate such sync frames in WUR packets that are configured to be received and decoded by LP-WURs such as the LP-WUR 150, and transmit the WUR packets via the one or more antennas 126.

Figure 1C:
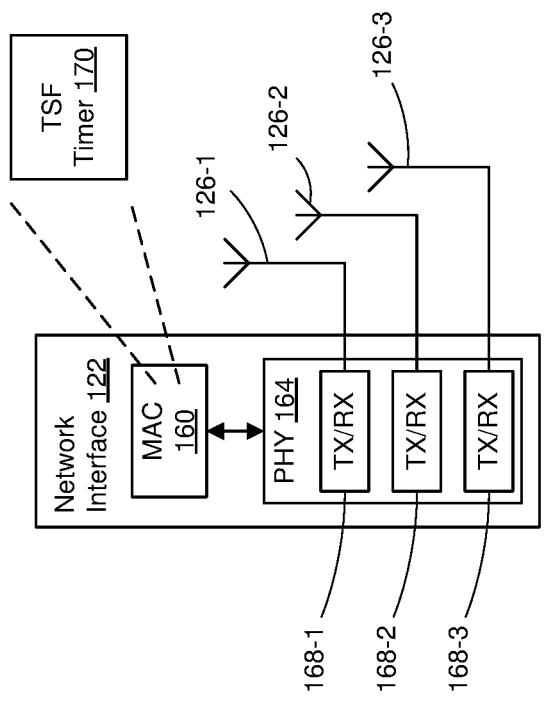
FIG. 1C is a block diagram of an example wireless network interface device of the client station included in the WLAN of FIG. 1A, according to an embodiment.

FIG. 1C is a block diagram of the network interface device 142 of the client station 134-1 of FIG. 1A, according to an embodiment. The network interface 142 includes a MAC layer processor 172 coupled to a PHY processor 174. The PHY processor 174 includes a plurality of transceivers 178 coupled to the one or more antennas 146. Although three transceivers 178 and three antennas 126 are illustrated in FIG. 1C, the PHY processor 174 includes other suitable numbers (e.g., 1, 2, 4, 5, etc.) of transceivers 178 coupled to other suitable numbers of antennas 146 in other embodiments. In some embodiments, the client station 134-1 includes a higher number of antennas 146 than transceivers 178, and the PHY processor 174 is configured to use antenna switching techniques.

The network interface 142 is implemented using one or more ICs configured to operate as discussed below. For example, the MAC layer processor 172 may be implemented, at least partially, on a first IC, and the PHY processor 174 may be implemented, at least partially, on a second IC. As another example, at least a portion of the MAC layer processor 172 and at least a portion of the PHY processor 174 may be implemented on a single IC. For instance, the network interface 142 may be implemented using a system on a chip (SoC), where the SoC includes at least a portion of the MAC layer processor 172 and at least a portion of the PHY processor 174.

In various embodiments, the MAC layer processor 172 and the PHY processor 174 of the client device 154-1 are configured to generate data units, and process received data units, that conform to the WLAN communication protocol or another suitable communication protocol. For example, the MAC layer processor 172 may be configured to implement MAC layer functions, including MAC layer functions of the WLAN communication protocol, and the PHY processor 174 may be configured to implement PHY functions, including PHY functions of the WLAN communication protocol. The MAC layer processor 172 may be configured to generate MAC layer data units such as MSDUs, MPDUs, etc., and provide the MAC layer data units to the PHY processor 174. The PHY processor 174 may be configured to receive MAC layer data units from the MAC layer processor 172 and encapsulate the MAC layer data units to generate PHY data units such as PPDUs for transmission via the one or more antennas 146. Similarly, the PHY processor 174 may be configured to receive PHY data units that were received via the one or more antennas 146, and extract MAC layer data units encapsulated within the PHY data units. The PHY processor 174 may provide the extracted MAC layer data units to the MAC layer processor 172, which then processes the MAC layer data units.

As discussed above, the network interface device 142 is configured to transition between an active state and a low power state. When the wireless network interface device 142 is in the low power state and receives the wakeup signal from the LP-WUR 150, the wireless network interface device 142 is configured to transition to the active power state in response to the wakeup signal, according to an embodiment.

The PHY processor 174 is configured to downconvert one or more RF signals received via the one or more antennas 146 to one or more baseband analog signals, and convert the analog baseband signal(s) to one or more digital baseband signals, according to an embodiment. The PHY processor 174 is further configured to process the one or more digital baseband signals to demodulate the one or more digital baseband signals and to generate a PPDU. The PHY processor 174 includes amplifiers (e.g., an LNA, a power amplifier, etc.), an RF downconverter, an RF upconverter, a plurality of filters, one or ADCs, one or more DACs, one or more DFT calculators (e.g., a fast Fourier transform (FFT) calculator), one or more IDFT calculators (e.g., an inverse fast Fourier transform (IFFT) calculator), one or more modulators, one or more demodulators, etc.

The PHY processor 174 is configured to generate one or more RF signals that are provided to the one or more antennas 146. The PHY processor 174 is also configured to receive one or more RF signals from the one or more antennas 146.

The MAC processor 172 is configured to control the PHY processor 174 to generate one or more RF signals by, for example, providing one or more MAC layer data units (e.g., MPDUs) to the PHY processor 174, and optionally providing one or more control signals to the PHY processor 174, according to some embodiments. In an embodiment, the MAC processor 172 includes a processor configured to execute machine readable instructions stored in a memory device (not shown) such as a RAM, a read ROM, a flash memory, etc. In an embodiment, the MAC processor 172 includes a hardware state machine.

In some embodiments, the wireless network interface device 142 is configured to receive non-wakeup data from the LP-WUR 150, such as WLAN beacon information, WUR capability information, WLAN capability information, WUR configuration information, WLAN configuration information, WUR management information, WLAN management information, WUR control information, WLAN control information, TSF timer information, etc. In an embodiment, the wireless network interface device 142 is configured to use the non-wakeup data for purposes other than transitioning to the active power state. For example, the MAC processor 172 of the wireless network interface device 142 is configured to use the non-wakeup data for performing MAC-related functions related to WLAN communications.

The MAC processor 172 includes a timer (or clock) circuit 180 (sometimes referred to herein as a "TSF timer"). The TSF timer 180 is used to maintain a network system clock for the network 110. In an embodiment, the TSF timer 180 maintains a clock that consists of n bits.

The MAC processor 172 is configured to process WiFi frames received from the AP 114 and that include full timestamps corresponding to the TSF timer 170 of the AP 114, and the MAC processor 172 is configured to adjust the TSF timer 180 using the full timestamps to synchronize the TSF timer 180 to the TSF timer 170. For example, the MAC processor 172 is configured to process beacon frames and/or probe response frames that include full timestamps corresponding to the TSF timer 170, and that are received by the PHY processor 174 in WiFi packets. In an embodiment, the MAC processor 172 is configured to generate probe request frames that are configured to prompt the AP 114 to transmit probe response frames. The PHY processor 174 is configured to encapsulate probe request frames in WiFi packets, and transmit the WiFi packets via the one or more antennas 146.

Additionally, the MAC processor 172 is configured to receive partial timestamps from the LP-WUR 150, the partial timestamps having been received by the LP-WUR 150 in sync frames (within WUR packets) from the AP 114. The MAC processor 172 is configured to adjust the TSF timer 180 using the partial timestamps to synchronize the TSF timer 180 to the TSF timer 170, e.g., when the network interface device 142 is in the low power state and cannot receive WiFi packets.

Figure 1D:
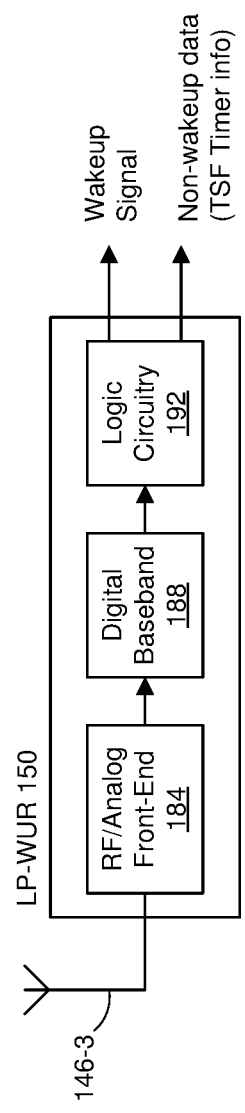
FIG. 1D is a block diagram of an example LP-WUR in the WLAN of FIG. 1A, according to an embodiment.

FIG. 1D is a block diagram of the LP-WUR 150 of the client station 134-1 of FIG. 1A, according to an embodiment. The LP-WUR 150 includes radio frequency (RF)/analog front-end circuitry 184 coupled to at least one of the antennas 146. The RF/analog front-end circuitry 184 includes one or more amplifiers (e.g., a low noise amplifier (LNA)), an RF downconverter, one or more filters, and one or more analog-to-digital converters (ADCs). In an embodiment, the RF/analog front-end circuitry 184 is configured to downconvert an RF signal to a baseband analog signal, and convert the analog baseband signal to a digital baseband signal.

The RF/analog front-end circuitry 184 is coupled to digital baseband circuitry 188. The digital baseband circuitry 188 is configured to process the digital baseband signal to determine whether the digital baseband signal corresponds to a wakeup packet. The digital baseband circuitry 188 includes a demodulator that demodulates data from the digital baseband signal to generate an information signal corresponding to information included in a wakeup packet.

The digital baseband circuitry 188 is coupled to logic circuitry 192. The logic circuitry 192 is configured to process the information signal to determine whether a wakeup packet includes an address (e.g., a MAC address, an AID, or another suitable network address) corresponding to the client station 134-1, according to an embodiment. The logic circuitry 192 is configured to generate the wakeup signal in response to determining that a received wakeup packet includes the address corresponding to the client station 134-1.

In some embodiments, the LP-WUR 150 is configured to provide non-wakeup data, such as WLAN beacon information, WUR capability information, WLAN capability information, WUR configuration information, WLAN configuration information, WUR management information, WLAN management information, WUR control information, WLAN control information, TSF timer information, etc., to the wireless network interface device 142. In some embodiments, the LP-WUR 150 is configured to use at least some types of non-wakeup data such as WUR capability information, WUR configuration information, WUR management information, WUR control information, etc.

In some embodiments, the logic circuitry 192 is configured to provide sync frames, or provide information within the sync frames (e.g., partial timestamps) to the network interface device 142.

In some embodiments, the LP-WUR 150 includes, in addition to or instead of the logic circuitry 192, a processor (not shown) that is configured to execute machine readable instructions stored in a memory (not shown) of the LP-WUR 150. In some embodiments, the processor (not shown) of the LP-WUR 150 is configured to execute machine readable instructions to one or both of: i) provide sync frames, or provide information within the sync frames (e.g., partial timestamps), to the network interface device 142, and/or ii) generate the wakeup signal, etc.

Figure 2:
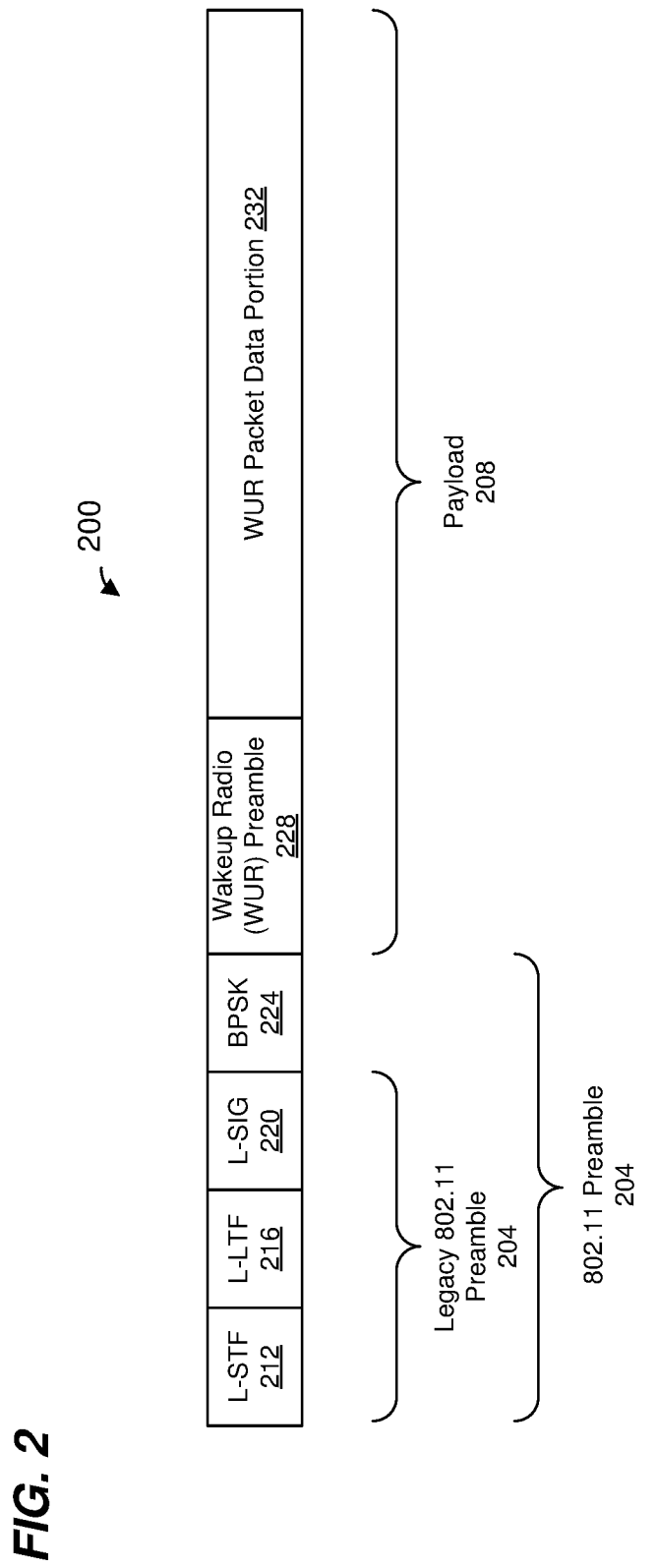
FIG. 2 is a block diagram of an example WUR packet, according to an embodiment.

FIG. 2 is a block diagram of a WUR packet 200 used in the example WLAN 110 of FIG. 1, according to an embodiment. The network interface 122 of the AP 114 is configured to generate and transmit the WUR packet 200, according to an embodiment. The network interface 142 of the client station 134-1 is also configured to generate and transmit the WUR packet 200, e.g., to another client station 134, according to another embodiment.

The LP-WUR 150 of the client station 134-1 is configured to receive, detect, and decode the WUR packet 200, according to an embodiment.

The WUR packet 200 includes an 802.11 preamble portion 204 and a payload 208. The 802.11 preamble portion 204 enables IEEE 802.11 stations (e.g., wireless communication devices that are configured to operate according to the IEEE 802.11 Standard) to detect the WUR packet 200 and determine a length of the WUR packet 200 for the purpose of reducing transmissions by IEEE 802.11 stations that will collide with the WUR packet 200, according to an embodiment.

The 802.11 preamble portion 204 includes a legacy 802.11 preamble 210, which corresponds to a legacy preamble defined by the IEEE 802.11 Standard, according to an embodiment. The legacy 802.11 preamble 210 includes a legacy short training field (L-STF) 212, a legacy long training field (L-LTF) 216, and a legacy signal field (L-SIG) 220. The L-STF 212 includes signals designed for packet detection and automatic gain control (AGC) training, for example. The L-LTF 216 includes signals designed for channel estimation, for example. The L-SIG 220 includes information regarding the WUR packet 200, including length information (e.g., in a length subfield (not shown)) that can be used by IEEE 802.11 stations to determine when the WUR packet 200 will end.

In other embodiments, the WUR packet 200 includes a legacy preamble (different than the legacy 802.11 preamble 210) that enables stations that conform to a different suitable wireless communication protocol (e.g., other than the IEEE 802.11 Standard) to detect the WUR packet 200 and determine a length of the WUR packet 200 for the purpose of reducing transmissions by such stations that will collide with the WUR packet 200, according to an embodiment.

In an embodiment, the 802.11 preamble portion 204 also includes an orthogonal frequency division multiplexing (OFDM) symbol 224 having binary phase shift keying (BPSK) modulated OFDM subcarriers that follows the legacy 802.11 preamble 210. In an embodiment, the OFDM symbol 224 is a repetition of the L-SIG 220. In an embodiment, the OFDM symbol 224 is identical to at least a portion of the L-LTF 216. In other embodiments, the OFDM symbol 224 includes any other suitable signal and/or information. In an embodiment, the OFDM symbol 224 does not convey any useful information to recipient communication devices. In another embodiment, the OFDM symbol 224 does convey useful information to recipient communication devices. In some embodiments, the OFDM symbol 224 is omitted from the WUR packet 200.

The payload 208 includes a WUR preamble 228. In an embodiment, the WUR preamble 228 includes signals that enable LP-WURs such as the LP-WUR 150 to detect the payload 208 of the WUR packet 200 and to synchronize to the payload 208 of the WUR packet 200. The payload 208 also includes a WUR packet data portion 232. In an embodiment, the WUR packet data portion 232 includes an address (e.g., a MAC address, an AID, or another suitable network address) corresponding to a client station (or client stations) to which the WUR packet 200 is intended. Referring now to FIG. 1D, the digital baseband circuitry 188 is configured to detect the WUR packet 200 at least by detecting the WUR preamble 228, according to an embodiment. The logic circuitry 192 is configured to process the WUR packet body 232 to determine whether the WUR packet body 232 includes an address (e.g., a MAC address, an AID, or another suitable network address) corresponding to the client station 134-1.

In an embodiment, the legacy 802.11 preamble 210 spans a first frequency bandwidth, and the WUR preamble 228 and the WUR packet data portion 232 span a second frequency bandwidth that is narrower than the first frequency bandwidth. For example, the first frequency bandwidth is 20 MHz and the second frequency bandwidth is a narrower bandwidth such as approximately 4 MHz (e.g. 4.06 MHz), or another suitable narrower bandwidth such as 1 MHz, 2 MHz, 5 MHz, 10 MHz, etc.

Figure 3:
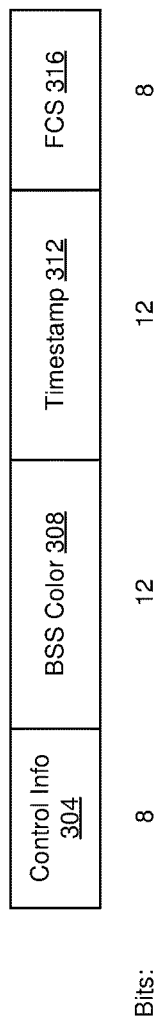
FIG. 3 is a diagram of an example sync frame that is included in the WUR packet of FIG. 2, according to an embodiment.

FIG. 3 is a diagram of an example sync frame 300 that is included in the WUR packet data portion 232 of the WUR packet 200 of FIG. 2, according to an embodiment. In other embodiments, the sync frame 300 that is included in a payload portion of another suitable WUR packet different from the WUR packet 200 of FIG. 2. In an embodiment, the network interface device 122 (e.g., the MAC processor 160) is configured to generate the sync frame 300. In other embodiments, another suitable network interface device is configured to generate the sync frame 300. The sync frame 300 is described in the context of FIGS. 1A-D merely for explanatory purposes. In other embodiments, the sync frame 300 is utilized in connection with another suitable communication network.

The sync frame 300 includes a control information field 304, a basic service set (BSS) color field 308, a timestamp field 312, and a frame check sequence (FCS) field 316. The BSS color field 308 includes an identifier of the network 110, which is sometimes referred to as a "BSS color". The timestamp field 312 includes a partial timestamp corresponding to the TSF timer 170 of the AP 114. The FCS field 316 includes error detection information corresponding to the control information field 304, the BSS color field 308, and the timestamp field 312.

In an embodiment, the TSF timer 170 consists of n bits, and the timestamp field 312 includes m bits, where m is less than n. In an embodiment, the TSF timer 170 comprises i) a most significant portion and ii) a least significant portion, and the timestamp field 312 includes a value of the least significant portion. In an embodiment, the most significant portion corresponds to the m-n most significant bits of the TSF timer 170, and the least significant portion corresponds to the n least significant bits of the TSF timer 170. In another embodiment, the most significant portion corresponds to the m-n-k most significant bits of the TSF timer 170, and the least significant portion corresponds to n bits between the m-n-k most significant bits and the k least significant bits of the TSF timer 170, where k is less than m. In an embodiment in which n is 64 and m is 12 and the bits of the TSF timer 170 are ordered 0 to 63, where bit 63 is the most significant bit and bit 0 is the least significant bit, the most significant portion corresponds to bits 12-63 of the TSF timer 170, and the least significant portion corresponds to bits 0 to 11 of the TSF timer 170. In another embodiment in which n is 64, m is 12, and k is 4, and the bits of the TSF timer 170 are ordered 0 to 63, where bit 63 is the most significant bit and bit 0 is the least significant bit, the most significant portion corresponds to bits 16-63 of the TSF timer 170, and the least significant portion corresponds to bits 4 to 15 of the TSF timer 170.

Because the timestamp field 312 does not include all n bits of the TSF timer 170, the overall length of the sync frame 300 is shortened as compared to if the sync frame 300 included all n bits of the TSF timer 170. Thus, the sync frame 300 channel efficiency as compared to if the sync frame 300 included all n bits of the TSF timer 170.

A client station 134 that receives the sync frame 300 can use the timestamp field 312 to synchronize the TSF timer 180 of the client station 134 to the TSF timer 170 of the AP 114. Because the TSF timestamp field 312 does not include all n bits of the TSF timer 170, however, and because of a clock drift between the TSF timer 170 and the TSF timer 180 between sync frames 300, problems with TSF timer synchronization can arise, which is discussed in more detail below.

FIG. 3 illustrates example numbers of bits for each of the control information field 304, the BSS color field 308, the timestamp field 312, and the FCS field 316. In other embodiments, one or more of the control information field 304, the BSS color field 308, the timestamp field 312, and the FCS field 316 includes a different suitable number of bits. In other embodiments, an order of the fields is different than illustrated in FIG. 3. In other embodiments, one or more of the fields illustrated in FIG. 3 is omitted and/or one or more other fields are included in the sync frame 300.

Figure 4:
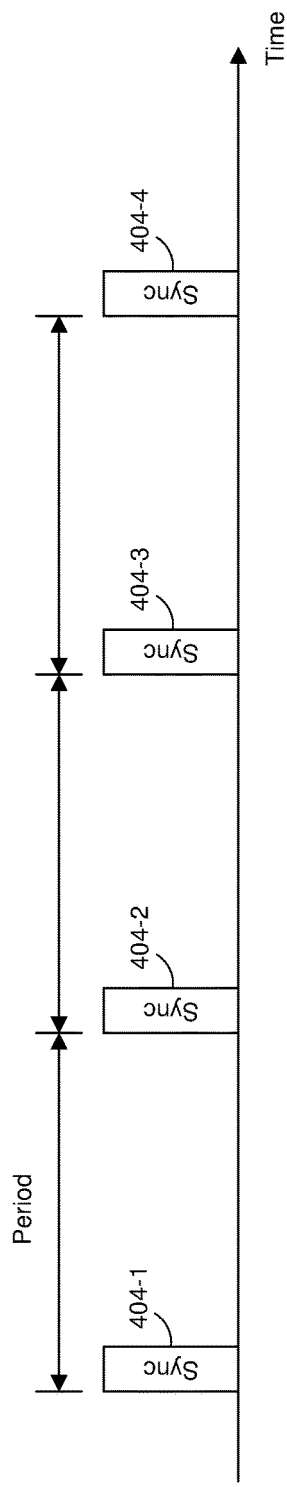
FIG. 4 is a timing diagram illustrating sync frames being transmitted periodically, according to an embodiment.

FIG. 4 is a timing diagram illustrating an example set of sync frames 404 transmitted by the AP 114 periodically within WUR packets (not shown), according to an embodiment. In an embodiment, the sync frames 404 are transmitted at a fixed period or interval. In an embodiment, the network interface device 122 (e.g., the MAC processor 160) of the AP 114 determines the period (interval) at which the sync frames 404 are transmitted. In another embodiment, a communication protocol defines the period (interval) at which the sync frames 404 are transmitted.

Referring now to FIGS. 1B, 1C, and 3, when the network interface 122 generates the sync frame 300, the most significant portion of the TSF timer 170 has a value X, and the network interface 122 sets the timestamp field 312 to the least significant portion of the TSF timer 170. After the sync frame 300 is transmitted by the AP 114 and received by the LP-WUR 150, and after the LP-WUR 150 has provided the timestamp in the field 312 to the network interface device 142, ideally the most significant portion of the TSF timer 180 also has the value X, and the network interface device 142 adjusts the least significant portion of the TSF timer 180 using the timestamp in the received sync frame, e.g., by setting the least significant portion of the TSF timer 180 based on (e.g., to) the value of the timestamp. Because of clock drift between the TSF timer 170 and the TSF timer 180, however, the most significant portion of the TSF timer

180 may have a value X+1 or X−1 when receiving the sync frame 300, in some situations. In such situations, merely adjusting the least significant portion of the TSF timer 180 using the timestamp in the received sync frame without adjusting the most significant portion of the TSF timer 180 will lead to the TSF timer 180 becoming unsynchronized with the TSF timer 170.

To account for a clock drift between the TSF timer 180 becoming unsynchronized with the TSF timer 170 causing the most significant portion of the TSF timer 180 to be different from the most significant portion of the TSF timer 170 when a partial timestamp is received, the network interface device 142 determines a mathematical difference between the partial timestamp and the least significant portion of the TSF timer 180, and uses the mathematical difference to selectively adjust the most significant portion of the TSF timer 180, according to an embodiment.

An embodiment for adjusting a TSF timer in response to a partial timestamp is described below in the context of a 64-bit TSF timer, and a 12-bit timestamp that corresponds to bits 0-11 of the TSF timer merely for explanatory reasons. In other embodiments, the numbers of bits in the TSF timer and/or the timestamp is different, and/or the timestamp corresponds to a different least significant portion of the TSF timer (e.g., the timestamp does not correspond to bit 0 of the TSF timer (e.g., the timestamp corresponds to bits 1-12 of the TSF timer), does not correspond to bits 0 and 1 of the TSF timer (e.g., the timestamp corresponds to bits 2-13 of the TSF timer), does not correspond to bits 0-2 of the TSF timer (e.g., the timestamp corresponds to bits 3-14 of the TSF timer), does not correspond to bits 0-3 of the TSF timer (e.g., the timestamp corresponds to bits 4-15 of the TSF timer), etc.).

When receiving a partial timestamp, the network interface device 142 determines a mathematical difference between the partial timestamp and the least significant portion of the TSF timer 180. In an embodiment, determining the mathematical different includes at least determining whether the most significant bit of the partial timestamp is different than the most significant bit of the least significant portion of the TSF timer 180. In response to determining that the most significant bit of the partial timestamp is the same as the most significant bit of the least significant portion of the TSF timer 180, the network interface device 142 determines that the most significant portion of the TSF timer 180 is not to be adjusted in response to receiving the partial timestamp, according to an embodiment.

On the other hand, at least when the most significant bit of the partial timestamp is different than the most significant bit of the least significant portion of the TSF timer 180, the network interface device 142 determines at least: i) a magnitude of a difference between the partial timestamp and the least significant portion of the TSF timer 180, and ii) whether the magnitude is larger than $2^{11}$ (e.g., $2^{m-1}$ where m is the number of bits in the partial timestamp), according to an embodiment. In response to determining that the magnitude of the difference between the partial timestamp and the least significant portion of the TSF timer 180 is not larger than $2^{11}$ (e.g., $2^{m-1}$), the network interface device 142 determines that the most significant portion of the TSF timer 180 is not to be adjusted in response to receiving the partial timestamp, according to an embodiment.

On the other hand, at least when the magnitude of the difference between the partial timestamp and the least significant portion of the TSF timer 180 is larger than $2^{11}$ (e.g., $2^{m-1}$), the network interface device 142 determines whether the partial timestamp is greater than the least significant portion of the TSF timer 180. In response to determining, i) the most significant bit of the partial timestamp is different than the most significant bit of the least significant portion of the TSF timer 180, ii) the magnitude of the difference between the partial timestamp and the least significant portion of the TSF timer 180 is larger than $2^{11}$ (e.g., $2^{m-1}$), and iii) the partial timestamp is greater than the least significant portion of the TSF timer 180, the most significant portion of the TSF timer 180 is incremented by one. On the other hand, in response to determining, i) the most significant bit of the partial timestamp is different than the most significant bit of the least significant portion of the TSF timer 180, ii) the magnitude of the difference between the partial timestamp and the least significant portion of the TSF timer 180 is larger than $2^{11}$ (e.g., $2^{m-1}$), and iii) the partial timestamp is less than the least significant portion of the TSF timer 180, the most significant portion of the TSF timer 180 is decremented by one.

Additionally, the least significant portion of the TSF timer 180 is set based on the value of the partial timestamp. In an embodiment, the least significant portion of the TSF timer 180 is set to the value of the partial timestamp.

Figure 5:
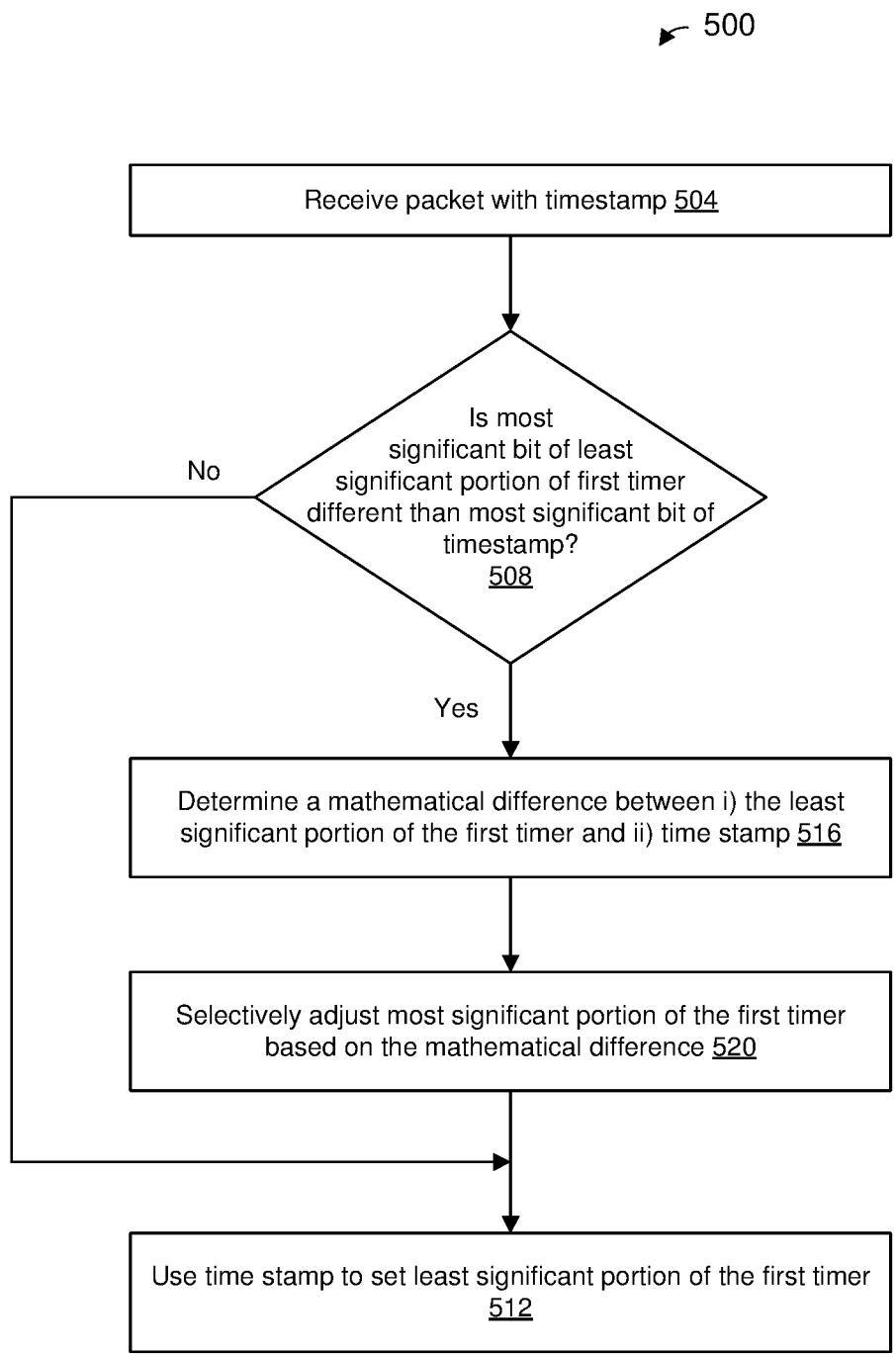
FIG. 5 is a flow diagram of an example method for synchronizing a first timer at a first communication device with a second timer at a second communication device, according to an embodiment.

FIG. 5 is a flow diagram of an example method 500 for synchronizing a first timer (e.g., the TSF timer 180) at a first communication device (e.g., the client station 134-1) with a second timer (e.g., the TSF timer 170) at a second communication device (e.g., the AP 114), according to an embodiment. In some embodiments, the network interface device 142 of FIGS. 1A and C is configured to implement the method 500. The method 500 is described, however, in the context of the network interface device 142 merely for explanatory purposes and, in other embodiments, the method 500 is implemented by another suitable device.

In an embodiment, the first timer comprises a least significant portion and a most significant portion, and the second timer comprises a least significant portion and a most significant portion.

At block 504, the first communication device receives a packet that includes a timestamp. The packet is from the second communication device, and the timestamp corresponds to the least significant portion of the second timer of the second communication device, according to an embodiment. The packet does not include any bits of the most significant portion of the second timer, according to an embodiment.

In an embodiment, the packet received at block 504 is a WUR packet, and the packet is received via a LP-WUR such as the LP-WUR of FIGS. 1A and D. In another embodiment, the packet received at block 504 is not a WUR packet and is not received via a LP-WUR. In an embodiment, the packet received at block 504 includes a sync frame such as the sync frame 300 of FIG. 3. In another embodiment, the packet received at block 504 does not include a sync frame such as the sync frame 300 of FIG. 3.

At block 508, the first communication device determines whether a most significant bit of the least significant portion of the first timer is different than a most significant bit of the timestamp in the packet received at block 504. In an embodiment, the network interface 142 is configured to determine whether the most significant bit of the least significant portion of the first timer is different than the most significant bit of the timestamp in the packet received at block 504. In an embodiment, the MAC processor 172 is configured to determine whether the most significant bit of the least significant portion of the first timer is different than the most significant bit of the timestamp in the packet received at block 504.

In response to determining at block 508 that the most significant bit of the least significant portion of the first timer is the same as the most significant bit of the timestamp in the packet received at block 504, the flow proceeds to a block 512. On the other hand, in response to determining at block 508 that the most significant bit of the least significant portion of the first timer is the different than the most significant bit of the timestamp in the packet received at block 504, the flow proceeds to a block 516.

At block 516, the first communication device determines a mathematical difference between i) the least significant portion of the first timer and ii) timestamp. In an embodiment, the network interface 142 is configured to determine the mathematical difference between i) the least significant portion of the first timer and ii) the timestamp. In an embodiment, the MAC processor 172 is configured to determine the mathematical difference between i) the least significant portion of the first timer and ii) the timestamp.

In an embodiment, block 516 comprises determining whether the timestamp is greater than the least significant portion of the first timer. In an embodiment, block 516 comprises determining that the timestamp is greater than the least significant portion of the first timer when the most significant bit of the timestamp is one; and determining that the least significant portion of the first timer is greater than the timestamp when the most significant bit of the least significant portion of the first timer is one.

In an embodiment, block 516 comprises determining a magnitude of a difference between the timestamp and the least significant portion of the first timer.

In an embodiment, block 516 comprises: when the timestamp is greater than the least significant portion of the first timer, determining a magnitude of a difference between the timestamp and the least significant portion of the first timer by subtracting the least significant portion of the first timer from the timestamp. In an embodiment, block 516 comprises: when the timestamp is less than the least significant portion of the first timer, determining a magnitude of a difference between the timestamp and the least significant portion of the first timer by subtracting the timestamp from the least significant portion of the first timer.

At block 520, the first communication device selectively adjusts the most significant portion of the first timer based on the mathematical difference between i) the least significant portion of the first timer and ii) the timestamp determined at block 516. In an embodiment, the network interface 142 is configured to selectively adjust the most significant portion of the first timer at block 520. In an embodiment, the MAC processor 172 is configured to selectively adjust the most significant portion of the first timer at block 520.

In an embodiment, the timestamp consists of m bits, the least significant portion of the first timer consists of m bits, and block 520 comprises: in response to determining that the magnitude of the difference between i) the least significant portion of the first timer and ii) the timestamp is not greater than $2^{m-1}$, proceeding to block 512 and not adjusting the most significant portion of the first timer.

In an embodiment, the timestamp consists of n bits, the least significant portion of the first timer consists of m bits, and block 520 comprises: when the magnitude of the difference between i) the least significant portion of the first timer and ii) the timestamp is greater than $2^{m-1}$: a) decreasing the most significant portion of the first timer by one when the timestamp is larger than the least significant portion of the first timer, and b) increasing the most significant portion of the first timer by one when the least significant portion of the first timer is larger than the timestamp.

At block 512, the first communication device sets the least significant portion of the first timer using the timestamp in the packet received at block 504. In an embodiment, the network interface 142 is configured to set the least significant portion of the first timer using the timestamp in the packet received at block 504. In an embodiment, the MAC processor 172 is configured to set the least significant portion of the first timer using the timestamp in the packet received at block 504.

In an embodiment, block 512 comprises setting the least significant portion of the first timer to the value of the timestamp in the packet received at block 504.

Referring again to FIG. 4, sync frames 404 are transmitted by the AP 114 periodically, according to an embodiment. In an embodiment, the sync frames 404 are transmitted at a fixed period or interval that is determined by the AP 114, e.g., by the network interface device 122 (e.g., the MAC processor 160) of the AP 114.

Figure 6:
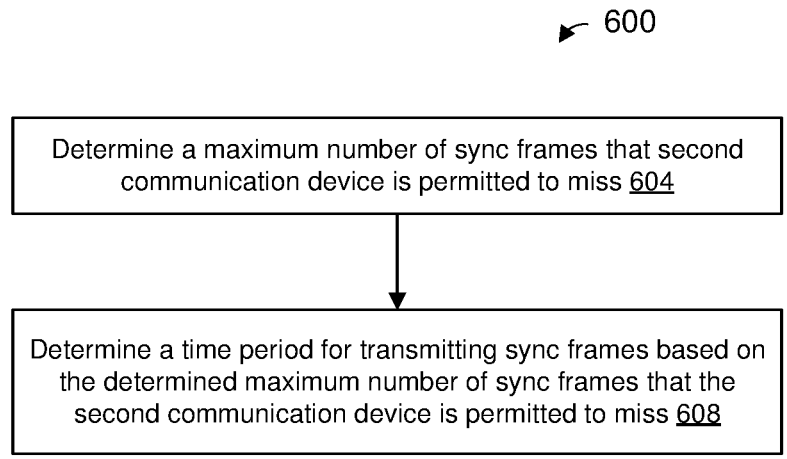
FIG. 6 is a flow diagram of an example method for determining a time period at which sync frames are periodically transmitted, according to an embodiment.

FIG. 6 is a flow diagram of an example method 600 for determining a time period at which frames that include a partial timestamp of a TSF timer (e.g., sync frames) are periodically transmitted, according to an embodiment. In some embodiments, the network interface device 122 of FIGS. 1A and B is configured to implement the method 600. The method 600 is described, however, in the context of the network interface device 122 merely for explanatory purposes and, in other embodiments, the method 600 is implemented by another suitable device.

At block 604, a second communication device (e.g., the AP 114) determines a maximum number Y of frames (e.g., sync frames), which include a partial timestamp of a second TSF timer of the second communication device, that a first communication device (e.g., the client station 134-1) is permitted to miss (e.g., not receive and/or not process). In an embodiment, the network interface device 122 is configured to determine the maximum number Y of sync frames that the first communication device (e.g., the client station 134-1) is permitted to miss (e.g., not receive and/or not process). In an embodiment, the MAC processor 160 is configured to determine the maximum number Y of sync frames that the first communication device (e.g., the client station 134-1) is permitted to miss (e.g., not receive and/or not process). In an embodiment, the first communication device (e.g., the client station 134-1) informs the second communication device (e.g., the AP 114) of the maximum number Y of frames (e.g., sync frames) that the first communication device is permitted to miss, e.g., in configuration information exchanged with the second communication device, e.g., in an association procedure. In another embodiment, the second communication device (e.g., the AP 114) informs the first communication device (e.g., the client station 134-1) of the maximum number Y of frames (e.g., sync frames) that the first communication device is permitted to miss, e.g., in network information exchanged with the first communication device, e.g., in an association procedure.

At block 608, the second communication device (e.g., the AP 114) sets the time period at which sync frames are periodically transmitted (sometimes referred to herein as the "sync period") so that a maximum drift of the first TSF timer during the time period between Y+1 frames does not exceed ½ of a maximum time value corresponding to the least significant portion of the second TSF timer. As an illustrative example, if the least significant portion of the second TSF timer consists of 12 bits, and counts in microseconds, the maximum time value corresponding to the least significant portion of the second TSF timer is 4095 ($2^{12}-1=4096-1$) microseconds, and ½ of the maximum time value is 2047.5 microseconds. In an embodiment, the network interface device 122 is configured to set the sync period so that the maximum drift of the first TSF timer during the time period between Y+1 frames does not exceed ½ of the maximum time value corresponding to the least significant portion of the second TSF timer. In an embodiment, the MAC processor 160 is configured to set the sync period so that the maximum drift of the first TSF timer during the time period between Y+1 frames does not exceed ½ of the maximum time value corresponding to the least significant portion of the second TSF timer.

In an embodiment, the first communication device and the second communication device are part of a wireless communication network that includes one or more third communication devices having one or more respective third TSF timers; each third first timer comprises a least significant portion; the method 600 further comprises: determining, at the second communication device, a maximum number of sync frames that any of the first communication device and the one or more third communication devices is permitted to miss; and the time period for transmitting the sync frames is determined based on the determined maximum number of sync frames that any of the first communication device and the one or more third communication devices is permitted to miss.

Figure 7:
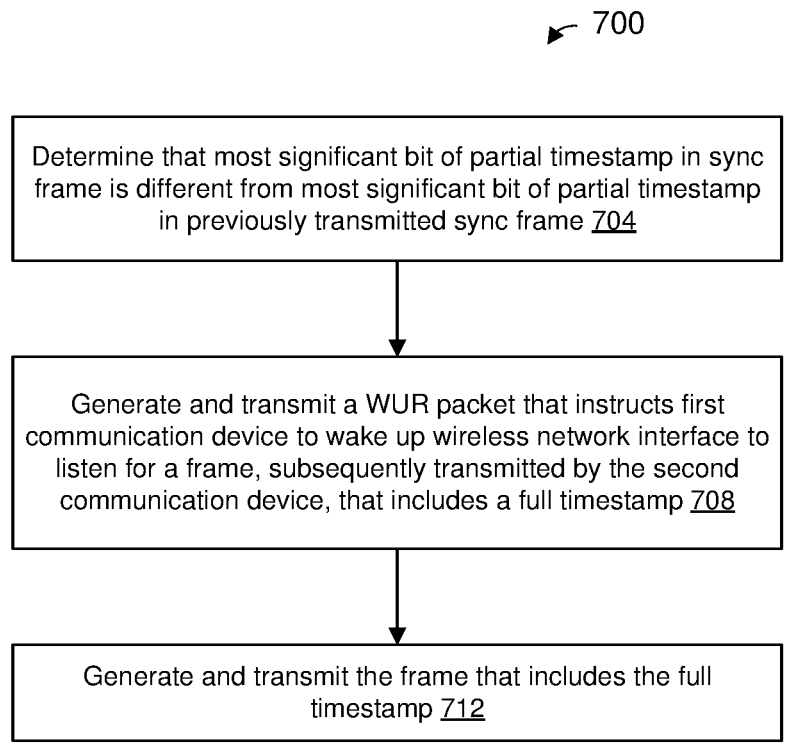
FIG. 7 is a flow diagram of another example method for synchronizing a first timer at a first communication device with a second timer at a second communication device, according to another embodiment.

FIG. 7 is a flow diagram of an example method 700 for synchronizing a first timer (e.g., the TSF timer 180) at a first communication device (e.g., the client station 134-1) with a second timer (e.g., the TSF timer 170) at a second communication device (e.g., the AP 114), according to an embodiment. In some embodiments, the network interface device 122 of FIGS. 1A and B is configured to implement the method 700. The method 700 is described, however, in the context of the network interface device 142 merely for explanatory purposes and, in other embodiments, the method 700 is implemented by another suitable device.

In an embodiment, the first timer comprises a least significant portion and a most significant portion, and the second timer comprises a least significant portion and a most significant portion.

At block 704, the second communication device determines that a value of a most significant bit of a timestamp in a first sync frame is different from a value of a most significant bit of a timestamp in a second sync frame that was previously transmitted by the second communication device. In an embodiment, the network interface device 122 is configured to determine the value of the most significant bit of the timestamp in the first sync frame is different from the value of the most significant bit of the timestamp in the second sync frame that was previously transmitted by the AP 114. In an embodiment, the MAC processor 160 is configured to determine the value of the most significant bit of the timestamp in the first sync frame is different from the value of the most significant bit of the timestamp in the second sync frame that was previously transmitted by the AP 114.

At block 708, in response to determining that the value of the most significant bit of the timestamp in the first sync frame is different from the value of the most significant bit of the timestamp in the previously transmitted second sync frame, the second communication device generates and transmits a WUR packet that instructs the first communication device to transition the network interface device 142 from the low power state to the active state to listen for a frame, subsequently transmitted by the first communication device, that includes i) a value of the least significant portion of the second timer, and ii) a value of the most significant portion of the second timer (e.g., a full timestamp). In an embodiment, the WUR packet is configured to prompt the first communication device to transition the network interface device 142 from the low power state to the active state to listen for a beacon frame. In an embodiment, the WUR packet is configured to prompt the first communication device to transition the network interface device 142 from the low power state to the active state to transmit a probe request frame, which will prompt the second communication device to transmit a probe response frame.

In an embodiment, the network interface device 122 is configured to generate and transmit the WUR packet of block 708. In an embodiment, the MAC processor 160 is configured to generate a frame configured to prompt the first communication device to transition the network interface device 142 from the low power state to the active state to listen for a beacon frame and/or to transmit a probe request frame and then listen for a probe response frame. In an embodiment, the PHY processor 164 is configured to encapsulate the frame in a WUR packet and transmit the packet.

At block 712, the second communication device generates and transmits the frame that includes i) the value of the least significant portion of the second timer, and ii) the value of the most significant portion of the second timer. In an embodiment, the frame transmitted at block 712 is a beacon frame. In an embodiment, the frame transmitted at block 712 is a probe response frame transmitted in response to the second communication device receiving a probe request frame from the first communication device. In an embodiment, the network interface device 122 is configured to generate the frame (a beacon frame, a probe response frame, etc.) at block 712. In an embodiment, the MAC processor 160 is configured to generate the frame (a beacon frame, a probe response frame, etc.) at block 712. In an embodiment, the PHY processor 164 is configured to encapsulate the frame in a packet and transmit the packet.

In some embodiments, the method 700 is performed in combination with the method 600.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of synchronizing a first timer at a first communication device with a second timer at a second communication device, wherein the first timer comprises a least significant portion and a most significant portion, and wherein the second timer comprises a least significant portion and a most significant portion, the method comprising:

receiving, at the first communication device, a packet that includes a timestamp, wherein the packet is from the second communication device, wherein the timestamp corresponds to the least significant portion of the second timer of the second communication device, and wherein the packet does not include any bits of the most significant portion of the second timer;

determining, at the first communication device, whether a most significant bit of the least significant portion of the first timer is different than a most significant bit of the timestamp;

at least when the most significant bit of the least significant portion of the first timer is different than the most significant bit of the timestamp, determining, at the first communication device, a mathematical difference between i) the least significant portion of the first timer and ii) the timestamp;

when the most significant bit of the least significant portion of the first timer is different than the most significant bit of the timestamp, selectively adjusting, at the first communication device, the most significant portion of the first timer based on the mathematical difference between i) the least significant portion of the first timer and ii) the timestamp; and using, at the first communication device, the timestamp to set the least significant portion of the first timer.

2. The method of claim 1, wherein:

determining the mathematical difference between i) the least significant portion of the first timer and ii) the timestamp comprises:

determining, at the first communication device, whether the timestamp is larger than the least significant portion of the first timer, and determining, at the first communication device, a magnitude of the mathematical difference between i) the least significant portion of the first timer and ii) the timestamp; and selectively adjusting the most significant portion of the first timer comprises:

selectively adjusting, at the first communication device, the most significant portion of the first timer based on i) whether the timestamp is larger than the least significant portion of the first timer, and ii) the magnitude of the mathematical difference between i) the least significant portion of the first timer and ii) the timestamp.

3. The method of claim 2, wherein:

the timestamp consists of m bits, wherein m is a positive integer greater than one;

the least significant portion of the first timer consists of m bits;

selectively adjusting the most significant portion of the first timer comprises:

in response to i) determining that the timestamp is larger than the least significant portion of the first timer, and ii) determining that the magnitude of the mathematical difference between a) the least significant portion of the first timer and b) the timestamp is greater than $2^{m-1}$, decreasing, at the first communication device, the most significant portion of the first timer by one; and selectively adjusting the most significant portion of the first timer further comprises:

in response to i) determining that the timestamp is smaller than the least significant portion of the first timer, and ii) determining that the magnitude of the mathematical difference between a) the least significant portion of the first timer and b) the timestamp is greater than $2^{m-1}$, increasing, at the first communication device, the most significant portion of the first timer by one.

4. The method of claim 3, wherein determining the mathematical difference between i) the least significant portion of the first timer and ii) the timestamp comprises:

when the timestamp is determined to be larger than the least significant portion of the first timer, subtracting, at the first communication device, the least significant portion of the first timer from the timestamp to determine a subtraction amount; and when the timestamp is determined to be smaller than the least significant portion of the first timer, subtracting, at the first communication device, the timestamp from the least significant portion of the first timer to determine the subtraction amount; and determining, at the first communication device, whether the subtraction amount is greater than $2^{m-1}$.

5. The method of claim 3, wherein:

m is 12;

the first timer comprises 64 bits; and the second timer comprises 64 bits.

6. An apparatus for use in a communication network having a first communication device and a second communication device, wherein the first communication device includes a first timer and the second communication device includes a second timer, wherein the first timer comprises a least significant portion and a most significant portion, and wherein the second timer comprises a least significant portion and a most significant portion, the apparatus comprising:

a network interface device associated with the first communication device, wherein the network interface device includes i) one or more integrated circuits (ICs), and ii) a timer circuit implemented on the one or more ICs, wherein the timer circuit corresponds to the first timer;

wherein the one or more ICs are configured to:

receive a packet that includes a timestamp, wherein the packet is from the second communication device, wherein the timestamp corresponds to the least significant portion of the second timer of the second communication device, and wherein the packet does not include any bits of the most significant portion of the second timer;

determine whether a most significant bit of the least significant portion of the first timer is different than a most significant bit of the timestamp;

at least when the most significant bit of the least significant portion of the first timer is different than the most significant bit of the timestamp, determine a mathematical difference between i) the least significant portion of the first timer and ii) the timestamp;

when the most significant bit of the least significant portion of the first timer is different than the most significant bit of the timestamp, selectively adjust the most significant portion of the first timer based on the mathematical difference between i) the least significant portion of the first timer and ii) the timestamp; and use the timestamp to set the least significant portion of the first timer.

7. The apparatus of claim 6, wherein the one or more ICs are further configured to:
- determine whether the timestamp is larger than the least significant portion of the first timer;
- determine a magnitude of the mathematical difference between i) the least significant portion of the first timer and ii) the timestamp; and
- selectively adjust the most significant portion of the first timer based on i) whether the timestamp is larger than the least significant portion of the first timer, and ii) the magnitude of the mathematical difference between i) the least significant portion of the first timer and ii) the timestamp.

8. The apparatus of claim 7, wherein:
- the timestamp consists of m bits, wherein m is a positive integer greater than one;
- the least significant portion of the first timer consists of m bits; and
- wherein the one or more ICs are further configured to:
  - in response to i) determining that the timestamp is larger than the least significant portion of the first timer, and ii) determining that the magnitude of the mathematical difference between a) the least significant portion of the first timer and b) the timestamp is greater than $2^{m-1}$, decrease the most significant portion of the first timer by one; and
  - in response to i) determining that the timestamp is smaller than the least significant portion of the first timer, and ii) determining that the magnitude of the mathematical difference between a) the least significant portion of the first timer and b) the timestamp is greater than $2^{m-1}$, increase the most significant portion of the first timer by one.

9. The apparatus of claim 8, wherein the one or more ICs are further configured to:
- when the timestamp is determined to be larger than the least significant portion of the first timer, subtract the least significant portion of the first timer from the timestamp to determine a subtraction amount; and
- when the timestamp is determined to be smaller than the least significant portion of the first timer, subtract the timestamp from the least significant portion of the first timer to determine the subtraction amount; and
- determine whether the subtraction amount is greater than $2^{m-1}$.

10. The apparatus of claim 8, wherein:
m is 12;
the first timer comprises 64 bits; and
the second timer comprises 64 bits.

* * * * *